United States Patent Office 3,595,753
Patented July 27, 1971

1

3,595,753
METHOD OF MAKING WHOOPING COUGH VACCINE

Vladimir Stejskal, Antonin Stejskal, and Vitezslav Stransky, Prague, Czechoslovakia, assignors to Ustav ser a ockovacich latek óborovy podnik, Prague, Czechoslovakia No Drawing. Continuation-in-part of application Ser. No. 639,022, May 17, 1967. This application Sept. 27, 1967, Ser. No. 671,092

Claims priority, application Czechoslovakia, May 20, 1966, 3,397/66

Int. Cl. C12k *1/00*

U.S. Cl. 195—96 3 Claims

ABSTRACT OF THE DISCLOSURE

A method of harvesting a culture of *H. pertussis* or *B. parapertussis* for conversion to whooping cough vaccine in which the growth rate of the microorganisms in an inoculated nutrient medium is monitored, and a major portion of the culture is periodically withdrawn for conversion to vaccine and replaced by fresh medium while the growth rate $\mu$ is between 2.8 and 5.0 and the number of microorganisms increases at an exponential rate. Under the usual aerobic culturing conditions and with stirring a crop of microorganisms at the peak of their effectiveness may be harvested every 10 to 20 hours.

REFERENCE TO RELATED APPLICATION

This application is a continuation-in-part of our copending application Ser. No. 639,022, filed on May 17, 1967, now abandoned.

BACKGROUND OF THE INVENTION

This invention relates to whooping cough vaccine and particularly to the harvesting of a culture of *H. pertussis* or *B. parapertussis* for conversion to vaccine.

Properly prepared whooping cough vaccine is commonly accepted as safe and effective. It is produced from cultures of Hemophilus pertussis and usually also of Bacillus parapertussis for simultaneous control of parapertussis. Mass production of the vaccine has become economical with the introduction of liquid culture media which are based on amino acids, vitamins, soluble phosphate, and trace elements.

The cultures are grown in relatively small shaking flasks or in sumberged cultures in larger fermentation tanks. Cultivation in shaking flasks requires relatively expensive apparatus and costly labor, and it is difficult or impossible to obtain a reasonably uniform product from the several flasks. Submerged cultures differ greatly in their antigen effects from batch to batch, and it is difficult to process the large amounts of culture produced in each run to vaccine at a rate sufficient to avoid impairment of the immunological properties of the vaccine ultimately obtained.

The object of the invention is the provision of a method by which whooping cough vaccine of uniform high quality can be produced at a high rate and at low cost.

SUMMARY OF THE INVENTION

We have found that a vaccine giving a vaccinated person long-lasting immunity against whooping cough with a minimum of side reactions can be prepared in a conventional manner from cultures of *H. pertussis* and *B. parapertussis,* if a major portion of the culture is periodically harvested while the number of microorganisms in the culture grows at an exponential rate, and each withdrawn portion is replaced by fresh culture medium.

2

Under practical conditions of cultivation, the exponential rate of increase occurs when the growth rate $\mu$ is between 2.8 and 5.0 per hour, and the proper moment for harvesting a portion of a continuous culture is readily determined by monitoring the number of microorganisms in a unit of volume. When the growth characteristics of the microbial strains employed are established, the growth rate is a function of time, and may be monitored simply by measuring the time from any step of a cycle of operations, for example, the replenishment of the residual culture with fresh culture medium.

Under known favorable conditions for promoting growth of the microorganism, each cycle of withdrawing a portion of the culture, replenishing the residue with fresh nutrient medium, and monitoring to a point where another withdrawal is in order takes between ten and twenty hours. Best results are obtained when the withdrawn culture portion amounts to 75–80 percent of the amount of the culture prior to withdrawal but the operation is highly successful with withdrawal of 70 to 85 percent of the culture in each cycle.

DESCRIPTION OF THE PREFERRED EMBODIMENTS

The method of the invention is further illustrated by the following example, and it will be understood that the invention is not limited thereto.

Example

The nutrient medium employed contained 0.185% total nitrogen and had the following composition:

Casein acid hydrolyzate (total nitrogen)—1.8 g.
Soluble starch—2.0 g.
Glutamic acid—0.23 g.
L-Cystine—0.030 g.
Yeast dialyzate (50%)—75 ml.
$KH_2PO_4$—0.4 g.
$CuSO_4.5H_2O$—0.00025 g.
$MgSO_4.7H_2O$—0.015 g.
$FeSO_4.7H_2O$—0.002 g.
Deionized water—to make 1000 ml.

It was adjusted to pH 7.0 with sodium hydroxide and held at 36° C.–37° C. during cultivation. A turbine stirrer rotating at 380 r.p.m. was used for agitation and the medium was aerated with a stream of air discharged in the solution at a gage pressure of 73 mm. Hg.

A starting culture of *Hemophilus pertussis* was prepared in shaking flasks from small batches of the nutrient medium which were inoculated with fresh strains of the microorganism isolated from recently infected humans. The suspension of the microorganisms so obtained was used as a 10% inoculum is large fermentation tanks filled to 75% of their capacity with the above medium. The number of microbes was determined from time to time. The microbe density reached a value of $36\times10^9$ per milliliter after 17 hours when the fourth test was made, and 80% of the culture was drawn off and replaced by fresh nutrient medium which was thereby inoculated.

The second cycle was terminated after these determinations of microbe density 15½ hours after inoculation at a cell density of $54\times10^9$ per milliliter, and 80% of the culture were again replaced by fresh nutrient solution.

During the third cycle, which was monitored by three microorganism counts, a density of $72\times10^9$ cells per milliliter was achieved in 13 hours. Again, 80% of the culture was replaced by fresh nutrient, and subsequent cycles differed only in the final microorganism count, each cycle being terminated after 14 hours. The ultimate microorganism densities in the fourth to tenth cycles were, in $10^9$ cells per milliliter, 71, 78, 76, 83, 81, 81, and 83 respectively.

The culture portions withdrawn after the second to tenth cycles were immediately converted to whooping cough vaccine by the method of Pekarek and Stejskal (Round Table Conference on Pertussis Immunization, Prague, 1962, Appendix, p. 12). The activities of the several batches obtained varied between 5 and 9 Protective Units per 0.5 ml.

Corresponding results were achieved with a parapertussis vaccine prepared from Bordtella parapertussis in a procedure otherwise identical with that described above.

Significantly less advantageous results are obtained when the portion of the culture withdrawn in each cycle is greater than 85% or smaller than 70%. The smaller inoculum left after large withdrawals produces fewer microorganisms during the period of exponential growth, and the relatively large amount of old microorganisms transferred to the next cycle by too small a withdrawal is ineffective and reduces the immunological activity of the vaccine ultimately produced. A cycle time of 14 hours and an ultimate cell density of more than $70 \times 10^9$ per milliliter are typical of good practice of this invention, and we have not been able to achieve such results with withdrawals of less than 70% nor more than 85% from the cultures. By harvesting the culture during the period of exponential growth, that is, the period of most rapid growth, we obtain vaccines of very high efficiency producing a minimum of side reactions.

After the second or third cycle, the culture reaches a practically steady state in which the successively harvested batches are uniform. This is impossible with the conventional batch methods of submerged cultivation. The conventional process steps following the harvesting of the microorganisms, when performed with reasonable care, do not cause major variations in the quality of the vaccine produced, and the instant invention eliminates the most important source of non-uniformity between different batches of whooping cough vaccine, if each withdrawn culture portion is further processed at once.

While the invention has been described with particular reference to a specific embodiment, it is to be understood that it is not limited thereto but is to be construed broadly and restricted solely by the scope of the appended claims.

We claim:

1. In the preparation of a whooping cough vaccine a method of preparing a culture in which a growth supporting liquid medium is inoculated with microorganisms selected from the group consisting of Hemophilus pertussis and Bordetella parapertussis, the inoculated medium is maintained under conditions promoting growth of the microorganisms, the improvement in maintaining said conditions which comprises:

(a) monitoring the growth rate $\mu$ of said microorganisms;

(b) withdrawing at least 70% but not more than 85% of said culture when said growth rate is between 2.8 and 5.0 per hour and the number of said microorganisms in said medium increases at an exponential rate;

(c) replacing the withdrawn culture portion by a fresh amount of said medium to produce another batch of inoculated medium,
   said monitoring, withdrawing, and replacing constituting a cycle of operations;

(d) maintain said replenished medium under conditions of growth rate of between 2.8 and 5.0 per hour;

(e) repeating said cycle at least twice to thereafter provide a culture having a cell density at least $70 \times 10^9$ per milliliter;

(f) thereafter, without the necessity for monitoring, periodically withdrawing at least 70% but not more than 85% of said culture portion for conversion to vaccine;

(g) replacing the same with a fresh amount of medium; and (h) each of said cycles being completed within a period of 10 to 20 hours.

2. In a method as set forth in claim 1, agitating said inoculated medium under aerobic conditions during each of said cycles.

3. In the preparation of a whooping cough vaccine a method of preparing a culture in which a growth supporting liquid medium is inoculated with microorganisms selected from the group consisting of Hemophilus pertussis and Bordetella parapertussis, the inoculated medium is maintained under conditions promoting growth of the microorganisms, the improvement in maintaining said conditions which comprises:

(a) monitoring the growth rate $\mu$ of said microorganisms;

(b) withdrawing at least 70% but not more than 85% of said culture when said growth rate is between 2.8 and 5.0 per hour and the number of said microorganisms in said medium increases at an exponential rate;

(c) replacing the withdrawn culture portion by a fresh amount of said medium to produce another batch of inoculated medium,
   said monitoring, withdrawing, and replacing constituting a cycle of operations;

(d) maintain said replenished medium under conditions of growth rate of between 2.8 and 5.0 per hour;

(e) repeating said cycle at least twice; and (f) wherein the first cycle has a duration of about 17 hours and the withdrawn culture has a cell density of at least $36 \times 10^9$, the second cycle has a duration of about 15 hours and the withdrawn culture has a cell density of at least $54 \times 10^9$ and the subsequent cycles have a duration of about 14 hours and the withdrawn culture has a cell density of at least $10 \times 10^9$, the withdrawn culture being replaced in all instances by between 70–85% by volume of the medium.

References Cited

UNITED STATES PATENTS

| | | | |
|---|---|---|---|
| 3,035,980 | 5/1962 | Tint et al. | 195—96X |
| 3,139,382 | 6/1964 | Killinger | 195—96 |

OTHER REFERENCES

Chemical Abstracts, vol 52 (1958), Kuwashima, K., Effective Agent for Pertussis, 9528f.

A. LOUIS MONACELL, Primary Examiner

G. M. NATH, Assistant Examiner

U.S. Cl. X.R.

195—115; 424—92